United States Patent
van Faassen

(10) Patent No.: US 7,410,047 B2
(45) Date of Patent: Aug. 12, 2008

(54) LINK FOR THE CONNECTION OF RODS OF A CONVEYOR BELT SPIRALLY WOUND AROUND A DRIVEN DRUM, CONVEYOR BELT AND CONVEYING SYSTEM WITH SUCH CONNECTIVE LINKS

(75) Inventor: Willem van Faassen, Hengelo (NL)

(73) Assignee: Ashworth Jonge Poerink B.V., Enschede (NL)

( * ) Notice: Subject to any disclaimer, the term of this patent is extended or adjusted under 35 U.S.C. 154(b) by 0 days.

(21) Appl. No.: 10/564,923

(22) PCT Filed: Jul. 2, 2004

(86) PCT No.: PCT/EP2004/007304

§ 371 (c)(1),
(2), (4) Date: Apr. 3, 2007

(87) PCT Pub. No.: WO2005/014442

PCT Pub. Date: Feb. 17, 2005

(65) Prior Publication Data

US 2007/0175735 A1    Aug. 2, 2007

(30) Foreign Application Priority Data

Jul. 17, 2003    (EP)    .................... 03077254

(51) Int. Cl.
*B65G 17/06*    (2006.01)

(52) U.S. Cl. ...................................... 198/778; 198/848
(58) Field of Classification Search ................. 198/778, 198/848
See application file for complete search history.

(56) References Cited

U.S. PATENT DOCUMENTS

| | | | | |
|---|---|---|---|---|
| 4,078,655 A * | 3/1978 | Roinestad | .................... | 198/848 |
| 4,972,942 A * | 11/1990 | Faulkner | ..................... | 198/853 |
| 5,139,135 A * | 8/1992 | Irwin et al. | ................. | 198/852 |
| 5,190,143 A * | 3/1993 | Froderberg et al. | ......... | 198/778 |
| 5,950,807 A * | 9/1999 | Greer | ......................... | 198/850 |
| 5,954,187 A | 9/1999 | Hager | | |
| 6,371,284 B1 * | 4/2002 | Pasch | ......................... | 198/848 |

FOREIGN PATENT DOCUMENTS

EP    0 488 702 A1    6/1992

\* cited by examiner

*Primary Examiner*—Douglas A Hess
(74) *Attorney, Agent, or Firm*—The Webb Law Firm

(57) ABSTRACT

The invention relates to a connective link for a conveyor belt, which comprises legs extending in a longitudinal direction from a lateral cross-member at a closed first end and to an open second end, and defining laterally aligned first apertures on each of said legs at said closed end for reception of a rod, and laterally aligned second apertures at said open end for reception of a rod, wherein at least one leg is extended in longitudinal direction over a distance from the second aperture. The invention further relates to a conveyor belt comprising said connective links.

6 Claims, 2 Drawing Sheets

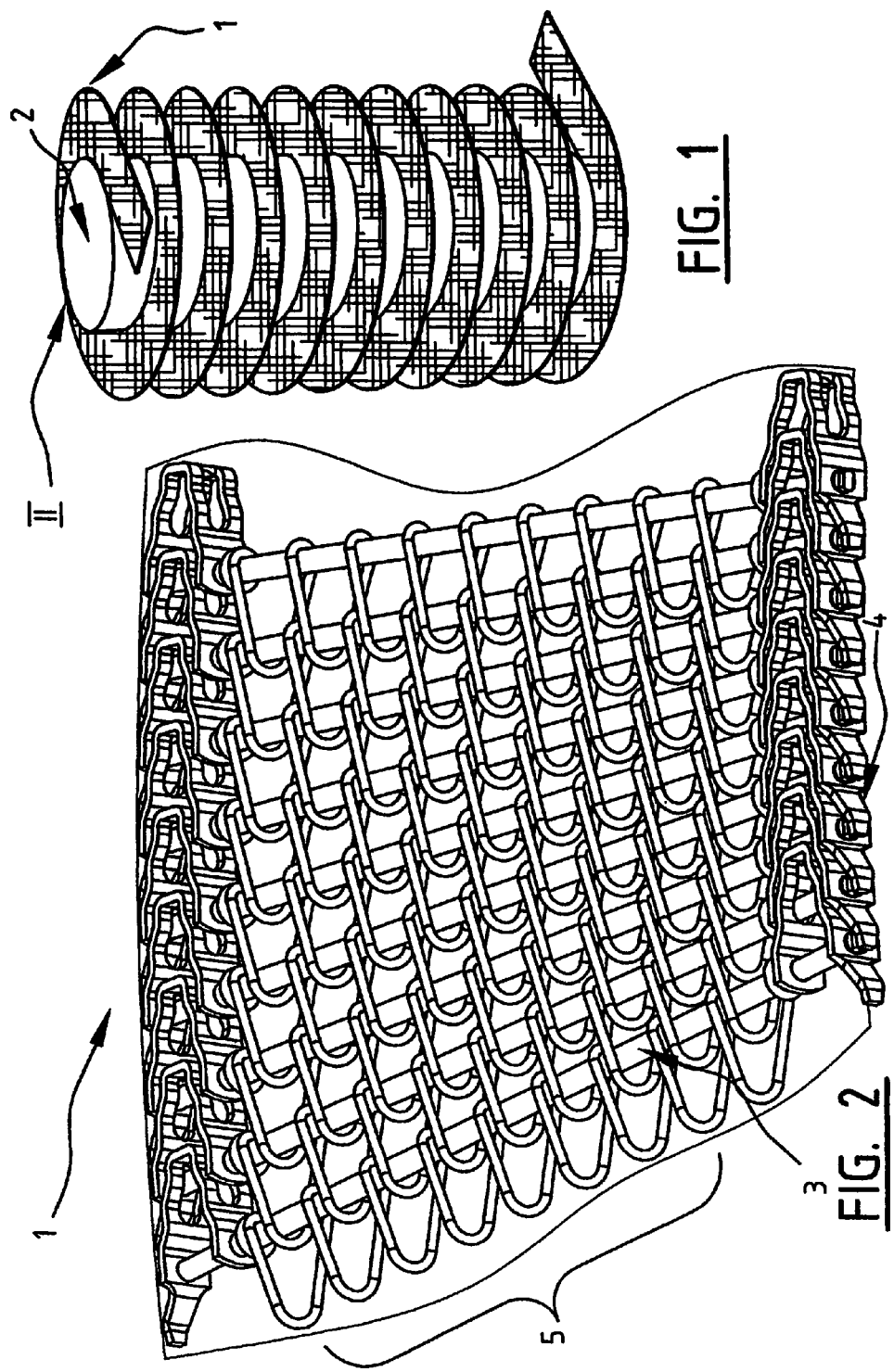

LINK FOR THE CONNECTION OF RODS OF A CONVEYOR BELT SPIRALLY WOUND AROUND A DRIVEN DRUM, CONVEYOR BELT AND CONVEYING SYSTEM WITH SUCH CONNECTIVE LINKS

BACKGROUND OF THE INVENTION

The invention relates to a conveyor belt for a system in which the conveyor belt is spirally wound around a driven drum, said conveyor belt comprising a repeating interconnected arrangement of:

longitudinally spaced rods each extending in a lateral direction defining first and second ends between a central conveying section; and connective links connecting the rods together, each connective link comprising legs extending in a longitudinal direction from a lateral cross-member at a closed first end and to an open second end, and defining laterally aligned first apertures on each of said legs at said closed end for reception of a rod, and laterally aligned second apertures at said open end for reception of a rod, whereby the first apertures of a first link are aligned with the second apertures of a second link for reception of a rod thereinto; wherein said rods are at least fused to said second apertures on the outside edge of the belt.

Such a belt is commonly used in cooling or heating towers, wherein the conveyor belt is spirally wound around a driven drum. This enables to have a large length of conveyor belt in a relatively small room. This has advantages when products have to be cooled or heated.

Due to this heating and cooling the conveyor belt is subjected to high stresses, which will eventually damage the conveyor belt. In conventional conveyor belts, the rods are welded to the links and this heating and cooling will eventually result in rupture of the weld.

Furthermore, as the belt is driven by the drum a slight speed difference between the driven drum and the conveyor belt will occur resulting in wear of the conveyor belt side as a result of the friction between the conveyor belt and the drum. Due to this wear, the weld between the rod and link on the outside of the conveyor belt will diminish and finally the connection between the rod and the link will disappear.

When the rod and the link are not connected anymore by the weld, the conveyor belt could buckle, which is also referred to as tenting. This could then result in jamming of the conveyor belt causing damage to the complete system.

SUMMARY OF THE INVENTION

It is therefore an object of the invention to provide a conveyor belt, wherein the wear and damage to the weld is reduced.

This object is achieved by a conveyor belt according to the invention, which is characterized by protection means arranged on the first link for protecting the fusion of the second link, at least when the links are in contact with the driven drum.

The protection means provide a protection for the fusion of the rod and link, such that the wear by the speed difference between the conveyor belt and the drum does not cause any damage to this fusion anymore.

According to an embodiment of the conveyor belt according to the invention the protection means extent in lateral direction of the conveyor belt beyond the fusion. So the protection means is shield of the fusion.

In a preferred embodiment according to the invention the outside leg of the first link is extended in longitudinal direction. This is a very simple embodiment as only the leg of the link has to be extended, resulting in shielding off the fusion of the second link, at least when the links are in contact with the driven drum. Although it is preferred, it is not necessary that the extension of the first link extends past the fusion. It should however extend such, that the fusion will not get into contact with a drum or the like.

The invention further relates to a conveying system comprising a vertically extending driven drum and a conveyor belt according to the invention spirally wound around the drum, wherein the protection means abut the drum. So the protection means shield off the fusion of the rod and links. The protection means can be made of a suitable material, such that wear of the protection means is minimized and the life span of the conveyor belt is extended.

Finally the invention relates to a connective link for a conveyor belt according to the invention, which connective link comprises legs extending in a longitudinal direction from a lateral cross-member at a closed first end and to an open second end, and defining laterally aligned first apertures on each of said legs at said closed end for reception of a rod, and laterally aligned second apertures at said open end for reception of a rod, wherein at least one leg is extended in longitudinal direction over a distance from the second aperture substantially equal to the distance between the first and second aperture.

BRIEF DESCRIPTION OF THE DRAWINGS

These and other features of the invention are elucidated in conjunction with the accompanying drawings.

FIG. 1 shows a perspective view of a conveyor belt according to the invention which is spirally wound around a driven drum.

FIG. 2 shows a sectional view of the conveyor belt according to the invention.

DETAILED DESCRIPTION OF THE PREFERRED EMBODIMENTS

Figure 3:
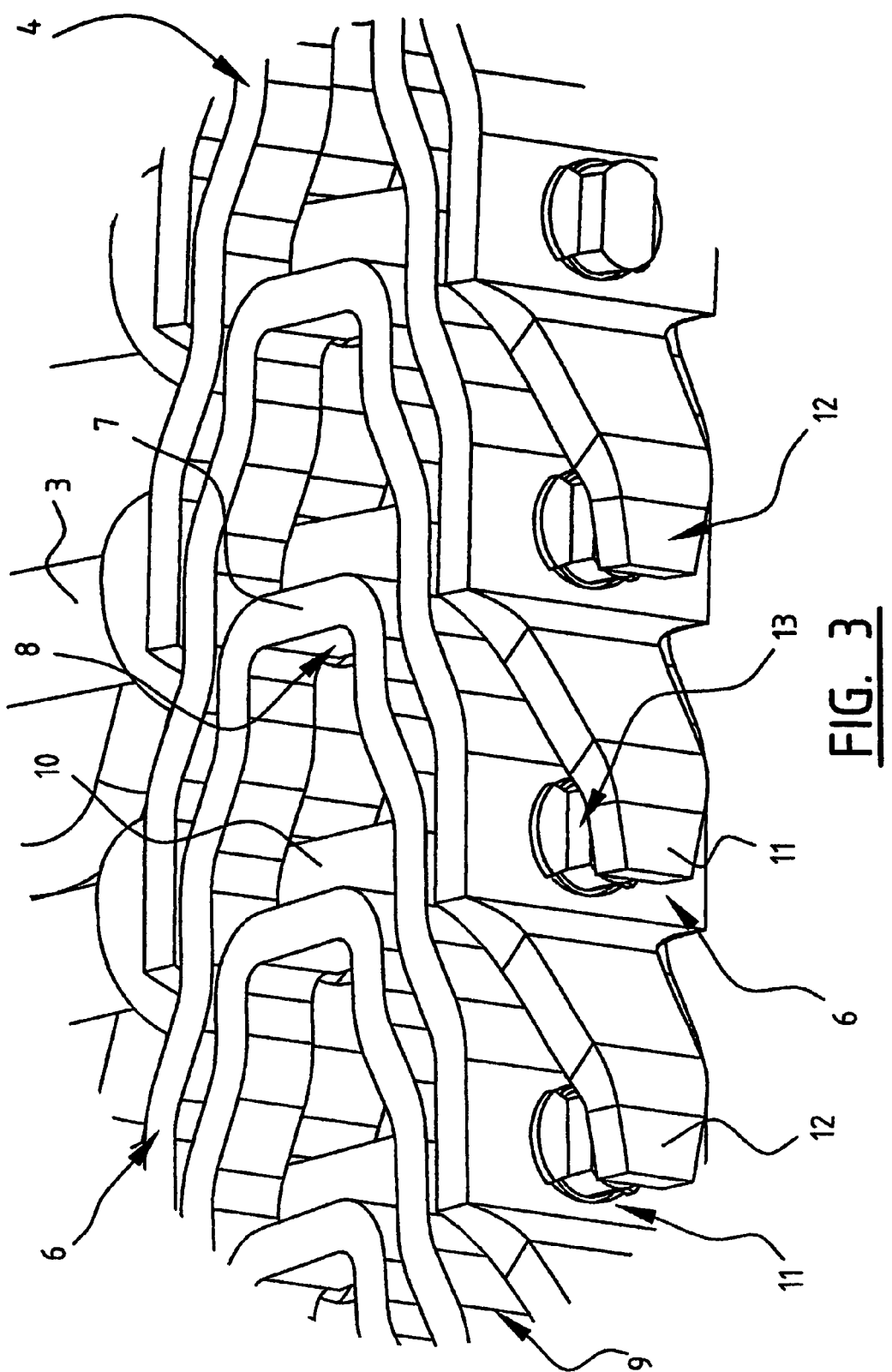
FIG. 3 shows a sectional view of the conveyor belt with connective links arranged with protecting means.

FIG. 1 shows a conveyor belt 1 according to the invention. The conveyor belt 1 is spirally wound around a driven drum 2.

FIG. 2 shows a sectional view of the conveyor belt 1. The conveyor belt 1 comprises longitudinal spaced rods 3 which extend in a lateral direction. In order to connect the rods 3 together each end of the rods 3 is provided with a connective link 4. Between the ends of the rods 3 is a central conveying section 5 which is used for conveying products, such as food.

FIG. 3 shows a sectional view of the connective links 4. Each connective link 4 comprises legs 6 which extend in a longitudinal direction from a lateral cross-member 7 at a closed first end 8 and to an open second end 9. Each leg 6 is provided with a first aperture 10 at the closed first end 8 for reception of a rod 3, and with a laterally aligned second aperture 11 at the open second end 9, also for receiving a rod 3. The first aperture 10 of a first link 4 is aligned with the second aperture 11 of a second link 4, such that a rod 3 is received therein. The rods 3 are fused to the second aperture 11 on the outside edge of the conveyor belt. On a first link protecting means 12 have been arranged to protect the fusion 13 of a second link when it is in contact with a drum.

The invention claimed is:

1. A conveyor belt for a system in which the conveyor belt is spirally wound around a driven drum, said conveyor belt comprising a repeating interconnected arrangement of:
   a) longitudinally spaced rods each extending in a lateral direction defining first and second ends between a central conveying section; and
   b) connective links connecting the rods together, each connective link comprising legs extending in a longitudinal direction from a lateral cross-member at a closed first end and to an open second end, and defining laterally aligned first apertures on each of said legs at said closed end for reception of a rod, and laterally aligned second apertures at said open end for reception of a rod, whereby the first apertures of a first link are aligned with the second apertures of a second link for reception of a rod thereinto; wherein said rods are at least fused to said second apertures on the outside edge of the belt,
   and further comprising protection means arranged on the first link for protecting the fusion of the second link, at least when the links are in contact with the driven drum.

2. The conveyor belt according to claim 1, wherein the protection means extend in a lateral direction of the conveyor belt beyond the fusion.

3. A conveying system comprising a vertically extending driven drum and a conveyor belt according to claim 2 spirally wound around the drum, wherein the protection means abut the drum.

4. The conveyor belt according to claim 1, wherein the outside leg of the first link is extended in a longitudinal direction.

5. A conveying system comprising a vertically extending driven drum and a conveyor belt according to claim 1 spirally wound around the drum, wherein the protection means abut the drum.

6. A connective link for a conveyor belt according to claim 1, which connective link comprises legs extending in a longitudinal direction from a lateral cross-member at a closed first end and to an open second end, and defining laterally aligned first apertures on each of said legs at said closed end for reception of a rod, and laterally aligned second apertures at said open end for reception of a rod,
   wherein at least one leg is extended in longitudinal direction over a distance from the second aperture substantially equal to the distance between the first and second aperture.

* * * * *